United States Patent
Vora et al.

(10) Patent No.: US 12,534,194 B1
(45) Date of Patent: Jan. 27, 2026

(54) PROPELLER BLADE CONFIGURATION

(71) Applicant: Wisk Aero LLC, Mountain View, CA (US)

(72) Inventors: Neel Vora, San Mateo, CA (US); Pranay Sinha, Sunnyvale, CA (US); Sebastian Thomas, Clayton, NC (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 18/537,573

(22) Filed: Dec. 12, 2023

Related U.S. Application Data

(60) Provisional application No. 63/432,282, filed on Dec. 13, 2022.

(51) Int. Cl.
| | |
|---|---|
| *B64C 27/473* | (2006.01) |
| *B64C 11/08* | (2006.01) |
| *B64C 27/22* | (2006.01) |

(52) U.S. Cl.
CPC ............ *B64C 27/473* (2013.01); *B64C 11/08* (2013.01); *B64C 27/22* (2013.01)

(58) Field of Classification Search
CPC ..... F04D 29/327; F04D 29/328; B64C 11/02; B64C 11/08; B64C 11/16; B64C 11/18;
(Continued)

(56) References Cited

U.S. PATENT DOCUMENTS 1,021,822 A * 4/1912 Broussouse .............. B63H 1/14
                                                    416/200 R
1,779,026 A * 10/1930 Wragg .................. F04D 29/327
                                                    416/200 R
(Continued)

FOREIGN PATENT DOCUMENTS

GB          176842 A * 3/1922 ............. B64C 11/20

OTHER PUBLICATIONS

Leishman , "Principles of Helicopter Aerodynamics", Cambridge University Press, 2nd edition, 2006, 25 pages.
(Continued)

*Primary Examiner* — Courtney D Heinle
*Assistant Examiner* — Ryan C Clark
(74) *Attorney, Agent, or Firm* — Kilpatrick Townsend & Stockton LLP

(57) ABSTRACT

A rotor system design can reduce blade-wake interaction by staggering the vertical mounting position of the rotor blades on a hub. By staggering the vertical position, as the hub turns, the turbulent air impingement on subsequent rotor blades can be reduced. By reducing the turbulence on subsequent rotor blades the drag and noise is reduced. In rotor systems with an even number of blades, opposing rotor blade pairs can be mounted at the same vertical distance which can be different from other opposing rotor blade pairs. In rotor systems with an odd number of rotor blades, the rotor blades can be mounted at a fixed or variable vertical distances from the preceding blade so each rotor blade travels in a different tip path plane. Other techniques for reducing the wake vortices impingement can include mounting opposing blades at a dihedral/anhedral angle with respect to subsequent rotor blades.

16 Claims, 11 Drawing Sheets

(58) Field of Classification Search
CPC ....... B64C 11/20; B64C 27/22; B64C 27/473; B64U 20/20; F05D 2220/324; F05D 2220/329; F05D 2250/30; F05D 2250/31
See application file for complete search history.

(56) References Cited

U.S. PATENT DOCUMENTS

| | | | |
|---|---|---|---|
| 10,689,095 B2 * | 6/2020 | Zerweckh | ............... B32B 21/10 |
| 11,209,014 B2 * | 12/2021 | Lin | ....................... F04D 29/666 |
| 2017/0274982 A1 * | 9/2017 | Beckman | ................. B64C 3/54 |

OTHER PUBLICATIONS

Young , "Vortex Core Size in the Rotor Near-Wake", NASA Technical Report Server, Jun. 1, 2003, pp. 1-27.

* cited by examiner

PROPELLER BLADE CONFIGURATION

CROSS-REFERENCES TO RELATED APPLICATIONS

This application claims benefit under 35 USC§ 119(e) to U.S. Provisional Patent Application No. 63/432,282 filed Dec. 13, 2022 and entitled "Propeller Blade Configuration", the disclosure of which is incorporated by reference herein in its entirety for all purposes.

BACKGROUND

Rotor systems can include multiple blades mounted on a rotor hub. The blades can be routinely mounted on the hub so that the blade tips for the rotor blades travel in the same horizontal plane. As the rotor hub rotates, the blades travel through the wake-induced turbulence of preceding blades. This reduces the lift produced by individual rotor blades and results in increased noise produced by the rotor blades, especially while the aircraft hovers.

BRIEF SUMMARY

Embodiments provide rotor system designs that improve the figure of merit of the rotor system and reduce the noise produced by the rotor system. In some embodiments, a rotor system design can reduce blade-wake interaction by staggering the vertical mounting position of the rotor blades on a hub. By staggering the vertical position of the rotor blades, when the rotor hub turns, the turbulent air from the preceding blade can be reduced.

In an aspect of the disclosure, a rotor system comprises a hub that extends a vertical height from a base of the hub when mounted on a driveshaft, and a plurality of rotor blades mounted to the hub, wherein the rotor blades are staggered at different vertical positions with respect to the base of the hub as compared to a preceding rotor blade and a succeeding rotor blade.

In various embodiments, the rotor system comprises an even number of rotor blades, and pairs of rotor blades on opposite sides of the hub are mounted at a same vertical position with respect to the base of the hub.

In various embodiments, the rotor system comprises an odd number of rotor blades, wherein each of the rotor blades is mounted at a different vertical position.

In various embodiments, subsequent rotor blades are a predetermined vertical distance apart.

In various embodiments, the predetermined vertical distance generates multiple tip path planes a fixed vertical distance apart.

In an aspect of the disclosure, a rotor system comprises a hub that extends a vertical height from a base of the hub when mounted on a driveshaft, and a plurality of rotor blades mounted to the hub, wherein a first rotor blade of the plurality of rotor blades is mounted at a first dihedral angle that is different from a second dihedral angle for a second rotor blade of the plurality of rotor blades, the second rotor blade follows the first rotor blade during rotation.

In various embodiments, at least a pair of opposing rotor blades of the plurality of rotor blades are mounted with a same dihedral angle.

In various embodiments, all opposing rotor blades of the plurality of rotor blades can be mounted at the same dihedral angle.

In various embodiments, at least a pair of opposing rotor blades of the plurality of rotor blades are mounted with a same anhedral angle.

In an aspect of the disclosure, an aircraft comprises a pair of wings mounted to a fuselage, one or more booms coupled to the pair of wings, a plurality of rotor systems mounted to the one or more booms, the rotor system comprising a hub that extends a vertical height from a base of the hub when mounted on a driveshaft, and a plurality of rotor blades mounted to the hub, wherein the rotor blades are staggered at different vertical positions with respect to the base of the hub as compared to a preceding rotor blade and a succeeding rotor blade.

In various embodiments, one or more of the plurality of rotor blades have different chord lengths.

In various embodiments, the rotor blades are in a staggered configuration comprising a first rotor blade at a first vertical distance from a second rotor blade and the second rotor blade at a second vertical distance from a third rotor blade. In various embodiments, the first vertical distance is same as the second vertical distance.

In various embodiments, the plurality of rotor systems comprise one or more vertical lift rotor systems.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1A:
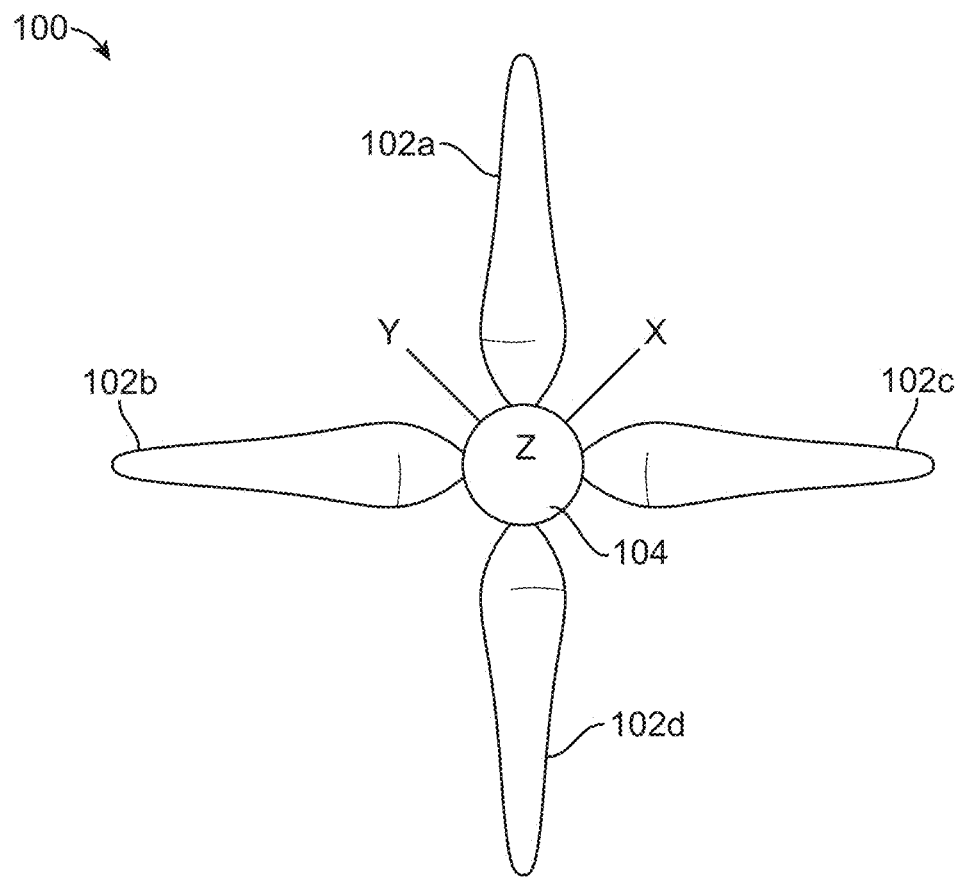
FIG. 1A illustrates a top-view of an exemplary four-bladed rotor system, according to various embodiments.

Techniques disclosed herein relate generally to a rotor system including a hub and a plurality of rotor blades mounted to the hub. More specifically, techniques disclosed herein provide a plurality of rotor blades arranged in a staggered and/or varied configuration along a hub reducing the aerodynamic drag of the rotor system. For example, adjacent rotor blades mounted to the hub are a predetermined vertical distance apart. For example, in a rotor system where the vertical mounting position of the rotor blades is staggered on a hub, the turbulent air from the preceding blade and/or the blade-wake interaction is reduced during rotation of the rotor hub. The staggering of the rotor blades reduces the wake vortices' impingement on subsequent rotor blades. Reducing the turbulence on the subsequent rotor blade reduces drag on that rotor blade as well as the overall noise of the rotor system. Various inventive embodiments are described herein, including processes, systems, devices, and the like.

According to various embodiments comprising rotor systems with an even number of blades, opposing rotor blade pairs can be mounted at a same vertical distance from a bottom of the hub while also being mounted at a different vertical distance from other opposing rotor blade pairs. For example, a first set of opposing blades can be mounted at a first vertical distance and a second set of opposing blade pairs can be mounted at a second vertical distance.

According to various embodiments comprising rotor systems having an odd number of rotor blades, the rotor blades can be mounted at fixed or variable vertical distances from the preceding rotor blade, such that each rotor blade travels in a different tip path plane. That is, the vertical difference between a first pair of adjacent blades and a second pair of adjacent blades may be the same (e.g., fixed vertical distance) or may be different (e.g., variable vertical distance). For example, the rotor blades may be staggered at different vertical positions with respect to the base of the hub as compared to a preceding rotor blade and a succeeding rotor blade.

In some embodiments comprising rotor systems having an even number of rotor blades, the rotor blades can be mounted at fixed or variable vertical distances from the preceding rotor blade, such that each rotor blade travels in a different tip path plane.

The desired (e.g., target, or optimal) vertical separation between the blades occurs at a point at which there is an acceptable level of increased drag in cruise but there is an improvement in wake vortex interference in transition and cruise flight configurations.

Other techniques for reducing the wake vortices impingement can include mounting opposing blades at a dihedral angle with respect to subsequent (e.g., adjacent) rotor blades. In this configuration, the rotor blades (e.g., at least two rotor blades) travel in different tip path planes.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary," or "example" is not necessarily to be construed as preferred or advantageous over other embodiments or designs.

FIG. 1A illustrates a top-view of an exemplary four-bladed rotor system 100, according to various embodiments. In various embodiments, the rotor system 100 can include four rotor blades (102a, 102b, 102c, 102d) connected to a hub 104. While four rotor blades (102a, 102b, 102c, 102d) are illustrated in FIG. 1A, two, three, four, five, or more rotor blades (102a, 102b, 102c, 102d) may be used. Each rotor blade (102a, 102b, 102c, 102d) can include a blade root at a proximal end of the rotor bade (102a, 102b, 102c, 102d). The proximal end of the rotor blade (102a, 102b, 102c, 102d) can be located at or near the hub 104. Each rotor blade (102a, 102b, 102c, 102d) can further include a blade tip at the distal end of the rotor blade (102a, 102b, 102c, 102d) opposite the proximal end. For example, the blade roots at the proximal end of four rotor blades (102a, 102b, 102c, 102d) can be coupled to a hub 104 such that the rotor blades (102a, 102b, 102c, 102d) extend away from the hub 104 and end in a blade tip at the distal end of the rotor blades (102a, 102b, 102c, 102d).

In some embodiments, the rotor blades (102a, 102b, 102c, 102d) can be individual components, attached at the hub 104. The rotor blades (102a, 102b, 102c, 102d) can be attached to the hub 104 at the same vertical distance from a base of the hub 104. For example, the rotor blades (102a, 102b, 102c, 102d) can be attached to the hub 104 such that they pass through the same horizontal plane while the hub 104 rotates.

Figure 1B:
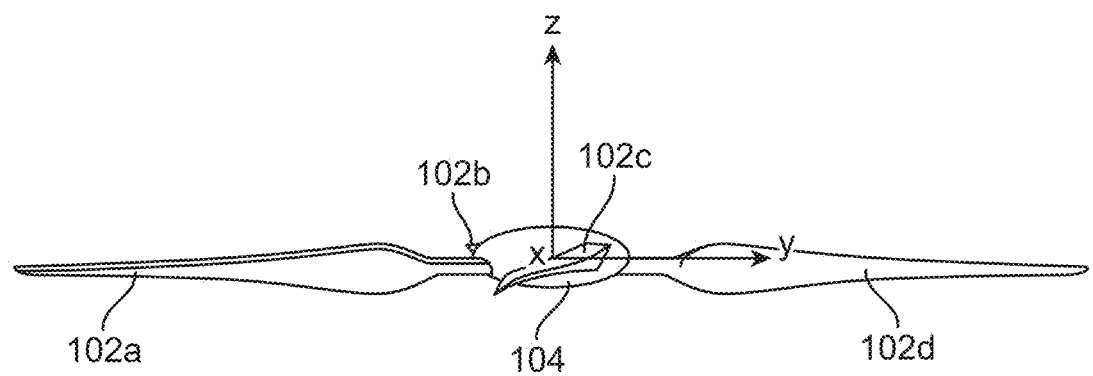
FIG. 1B illustrates a side-view of the exemplary four-bladed rotor system, according to various embodiments.

FIG. 1B illustrates a side-view of the exemplary four-bladed rotor system 100, according to various embodiments. FIG. 1B depicts four equivalent rotor blades (102a, 102b, 102c, 102d) where rotor blade 102c is shown extending from the hub 104 towards the viewer (e.g., "out of the page") and rotor blade 102b is shown extending from the hub 104 away from the viewer (e.g., "into the page".) As shown in FIG. 1B all of the rotor blades (102a, 102b, 102c, 102d) can be mounted to a hub 104 such that the rotor blade tips all rotate in the same tip path plane. As discussed above, as the rotor blades (102a, 102b, 102c, 102d) pass through the air, each of the rotor blades (102a, 102b, 102c, 102d) generate strong vortices that trails from the tip of each blade. Rotating blades, like fixed wings, cause the formation of concentrated vortices at their tips. Pressure equalization in the blade tip region and the combination of axial velocity (free-stream and/or rotor-induced) and rotational motion of the blade leads to the characteristic helical shape of the rotating blades. Helical vortex wakes and their dynamics can be relevant to many practical issues. For example, for certain types of aircraft, the helical tip vortices and their interaction with a following blade (blade-vortex interaction (BVI)) can generate unwanted noise and cause vibrations of the structure in certain flight regimes.

Figure 2A:
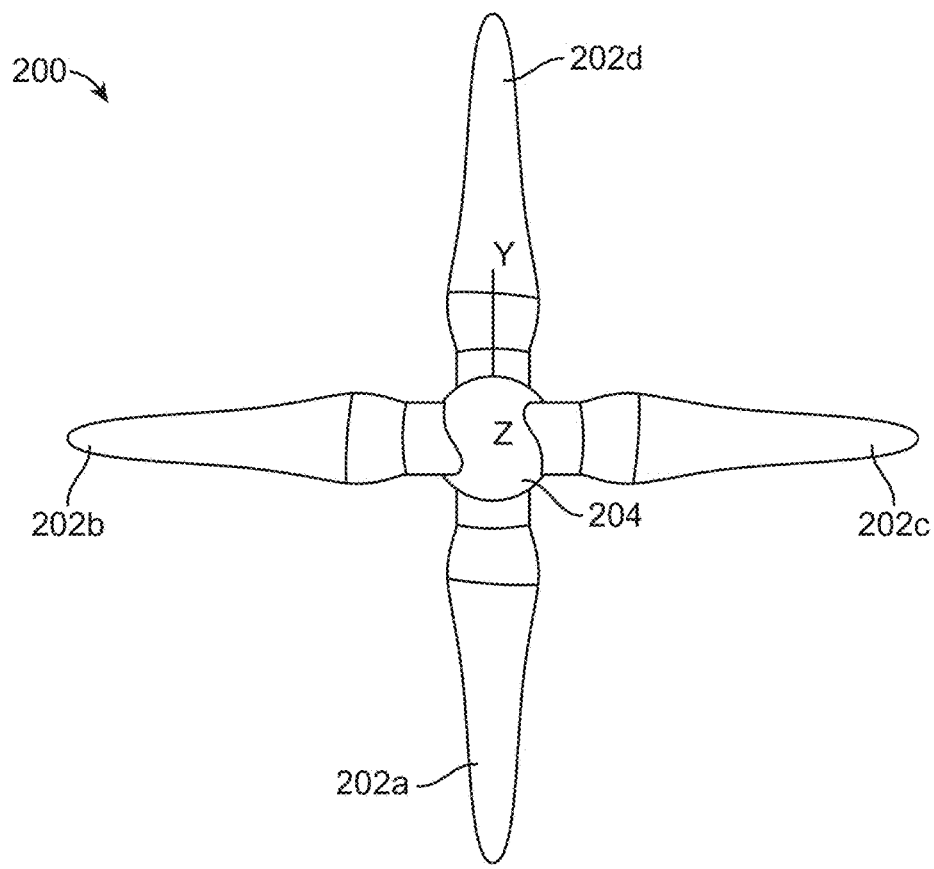
FIG. 2A illustrates a top-view of an exemplary four-bladed rotor system, according to various embodiments.

FIG. 2A illustrates a top-view of an exemplary four-bladed rotor system 200, according to various embodiments. In various embodiments, the rotor system 200 can have four rotor blades (202a, 202b, 202c, 202d) connected to a hub 204. While four rotor blades (202a, 202b, 202c, 202d) are illustrated in FIG. 2A, two, three, four, five, or more rotor blades (202a, 202b, 202c, 202d) may be used. In some embodiments the rotor blades (202a, 202b, 202c, 202d) can be essentially identical. Alternatively or additionally, the four rotor blades (202a, 202b, 202c, 202d) can vary to some degree (e.g., at least two rotor blades may be structurally different, or may be made of different materials). Each rotor blade (202a, 202b, 202c, 202d) be constructed from one or more composite materials (e.g., carbon fiber reinforced prepregs (CFRP)). Each rotor blade (202a, 202b, 202c, 202d) can include a blade root at a proximal end of the rotor bade (202a, 202b, 202c, 202d). The proximal end of the rotor blade (202a, 202b, 202c, 202d) can be located at or near the hub 204. Each rotor blade (202a, 202b, 202c, 202d) can further include a blade tip at the distal end of the rotor blade (202a, 202b, 202c, 202d) opposite the proximal end. For example, the blade roots at the proximal end of four rotor blades (202a, 202b, 202c, 202d) can be coupled to a hub 204 such that the rotor blades (202a, 202b, 202c, 202d) extend away from the hub 204 and end in a blade tip at the distal end of the rotor blades (202a, 202b, 202c, 202d).

In various embodiments, the rotor blades (202a, 202b, 202c, 202d) can have variable chord length (e.g., rotor blades (202a, 202b, 202c, 202d) can have the same chord lengths and/or different chord lengths). For example, a first set of rotor blades 202a and 202b can have different chord lengths than the chord lengths of a second set of rotor blades 202c and 202d. One or more of the rotor blades (202a, 202b, 202c, 202d) can have different chord lengths. For example, rotor blade 202a may have a different chord length than rotor blade 202b. In some embodiments, a hub 204 can have a combination of mounted rotor blades (202a, 202b, 202c, 202d) where some rotor blades (202a, 202b, 202c, 202d) have the same or similar chord lengths and some rotor blades (202a, 202b, 202c, 202d) have different chord lengths. For example, rotor blades 202a and 202c can have a first chord length and rotor blades 202b and 202d can have a second chord length, which is a different chord length from the first chord length. In various embodiments, the rotor blades (202a, 202b, 202c, 202d) can be twisted, such that the chord line changes from the root of the rotor blades (202a, 202b, 202c, 202d) to the tip of the rotor blades (202a, 202b, 202c, 202d). Alternatively or additionally, the rotor blades (202a, 202b, 202c, 202d) can include a straight portion and a twisted portion. For example, from the root of the rotor blades (202a, 202b, 202c, 202d) to a first point, the chord line may be straight, then from the first point to the tip of the rotor blades (202a, 202b, 202c, 202d) the chord line may be twisted. In various embodiments, the blade twist can be variable for one or more of the rotor blades (202a, 202b, 202c, 202d). For example, rotor blade 202a can include a small blade twist, rotor blades 202b and 202c can include large blade twists, and rotor bade 202b can include a negligible blade twist. In various embodiments, the rotor blades (202a, 202b, 202c, 202d) can be identical except the root (202a, 202b, 202c, 202d) that attaches to the hub 204. For example, each rotor blade (202a, 202b, 202c, 202d) can have a fixed angular position on the hub 104 that varies by degree based on how its root is coupled to the hub.

In some embodiments, the rotor blades (202a, 202b, 202c, 202d) can be individual components, attached at the hub 204. The rotor blades (202a, 202b, 202c, 202d) can be attached at the root of the blade to the hub 104 using one or more of bolts, fasteners, blade grips, or elastomeric bearing. The rotor blades (202a, 202b, 202c, 202d) can be attached to the hub 204 at a different vertical distance from a base of the hub 204. For example, the rotor blades (202a, 202b, 202c, 202d) can be attached to the hub 204 such that they pass through the same horizontal plane while the hub 204 rotates. In various embodiments, the hub 204 and the rotor blades (202a, 202b, 202c, 202d) can be formed as a single composite structure and/or integrated into a single structure. In various embodiments, the rotor blades (202a, 202b, 202c, 202d) and the hub 204 can be formed as a single piece.

The rotor blades (202a, 202b, 202c, 202d) can be mounted at a fixed pitch to the hub 204. The fixed pitch of the rotor blades (202a, 202b, 202c, 202d) can be chosen based on the aircraft. For example, a low pitch may be chosen for one or more rotor blades (202a, 202b, 202c, 202d) to provide improved vertical lift. Alternatively, a high pitch may be chosen for the one or more rotor blades (202a, 202b, 202c, 202d) to provide improved horizontal thrust. In some embodiments, the pitch of the rotor blades (202a, 202b, 202c, 202d) may vary. For example, the pitch of the rotor blades 202a and 202b (or 202a and 202d) may be different from the pitch of the rotor blades 202c and 202d (or 202b and 202c). There is a vertical distance between the rotor blades (202a, 202b, 202c, 202d) as measured from a base of the hub 204 at which the interference techniques can be effective. The vertical distance between the rotor blades (202a, 202b, 202c, 202d) may be chosen such that the hub 204 at the center is as streamlined as possible with the airflow in cruise conditions.

In embodiments with an even number of rotor blades (202a, 202b, 202c, 202d), rotor blade pairs (202a and 202c, 202b and 202d) on opposite sides of the hub 204 can be at the same vertical distance from the base of the hub 204. For example, rotor blade 202a and rotor blade 202d, mounted on opposite sides of the hub 204, may be at the same vertical distance from the base of the hub 204 such that when the hub 204 rotates, both rotor blades 202a and 202d pass through the same horizontal plane. Alternatively, rotor blade pairs (202a and 202c, 202b and 202d) on opposite sides of the hub 204 can be at different vertical distances from the base of the hub 204. For example, each one of the rotor blades 202a and 202d may be at different vertical distances from the base of the hub 204. Pairs of adjacent rotor blades (202a and 202b, 202b and 202c, 202c and 202d, 202d and 202a) may also vary in vertical distance from the base of the hub 204. In some embodiments, pairs of adjacent rotor blades (202a and 202b, 202b and 202c, 202c and 202d, 202d and 202a) may be at the same vertical distance from the base of the hub 204. For example, rotor blades 202a and 202c may be at the same vertical distance from the base of the hub 204 such that when the hub 204 rotates, the rotor blade pair 202a and 202c pass through the same horizontal plane. Alternatively, pairs of adjacent rotor blades (202a and 202b, 202b and 202c, 202c and 202d, 202d and 202a) may be at different vertical distances from the base of the hub 204. For example, each one of the rotor blades 202a and 202c may be at different distances from the base of the hub 204 such that when the hub 204 rotates, the rotor blade pair 202a and 202c do not pass through the same horizontal plane.

In some embodiments, adjacent rotor blades (202a and 202b, 202b and 202c, 202c and 202d, 202d and 202a) may be mounted at a predetermined vertical distance apart along the base of the hub 204. For example, rotor blades 202a and 202b may be mounted at a first predetermined distance apart along the hub 204 and rotor blades 202b and 202c may be mounted at a second predetermined distance apart. In some instances, the predetermined distance between a first set of rotor blades (202a and 202b, 202b and 202c, 202c and 202d, 202d and 202a) may be the same as the predetermined distance between a second set of rotor blades (202a and 202b, 202b and 202c, 202c and 202d, 202d and 202a). For example, the first predetermined distance of rotor blades 202a and 202b may be the same as the second predetermined distance of rotor blades 202b and 202c. Additionally or alternatively, the predetermined distance between a first set of rotor blades may be different than the predetermined distance between a second set of rotor blades. For example, the first predetermined distance of rotor blades 202a and 202b may be different than the second predetermined distance of rotor blades 202b and 202c.

According to embodiments providing a rotor system 200 including two or more rotor blades (202a, 202b, 202c, 202d), the blade tips can rotate in multiple tip path planes (206a and 206b). The rotor blades (202a, 202b, 202c, 202d) can be mounted along the hub 204 at a predetermined vertical distance apart such that the rotor blades (202a, 202b, 202c, 202d) generate multiple tip path planes (206a and 206b) a fixed vertical distance apart. For instance, for a rotor system 200 where adjacent rotor blades 202a and 202b are at a predetermined distance apart, a second plane 206b generated by rotor blade 202a may be at a fixed vertical distance apart from a first plane 206a generated by rotor blade 202b. In at least one embodiment, the fixed vertical distance between the multiple tip path planes (206a and 206b) can be between 15 and 30 centimeters. In at least one embodiment, the fixed vertical distance between the multiple tip path planes (206a and 206b) can be 25 centimeters apart.

Figure 2B:
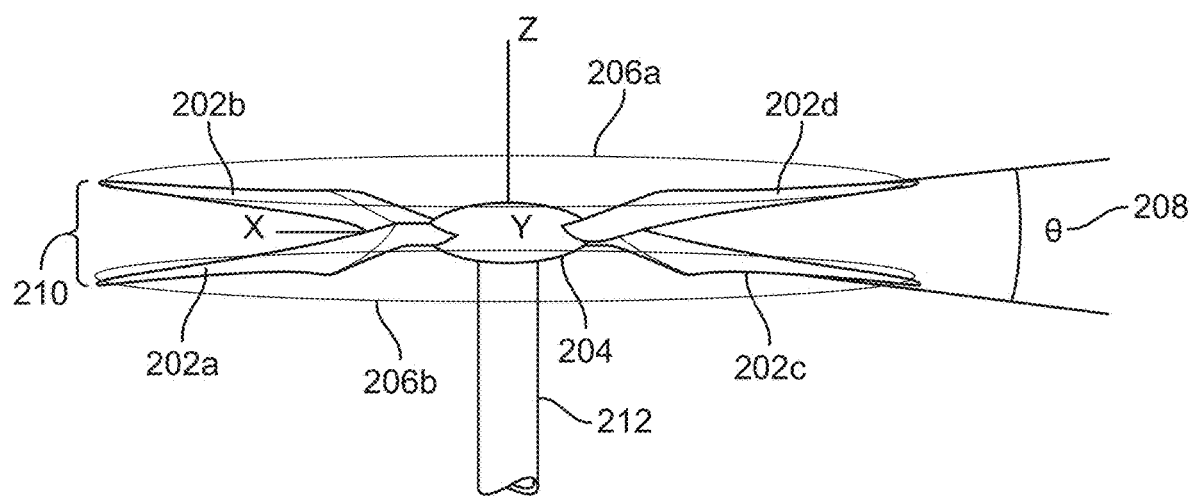
FIG. 2B illustrates a side-view of the exemplary four-bladed rotor system, according to various embodiments.

FIG. 2B illustrates a side-view of the exemplary four-bladed rotor system 200, according to various embodiments. As shown in FIG. 2B, all of the rotor blades (202a, 202b, 202c, 202d) can be mounted to the hub 204 such that two of the rotor blades (202b, 202d) rotate in a first plane 206a and the other two rotor blades (202a, 202c) rotate in a second plane 206b. The second plane 206b can be orientated parallel to the first plane 206a, and separated from the first plane 206a by a distance 210. In some embodiments, each rotor blade may rotate in an individual plane, such that the blades (202a, 202b, 202c, 202d) rotate in four parallel planes that are separated from each other by a (same or varying) distance.

One or more rotor blades (202a, 202b, 202c, 202d) can be mounted to the hub 204 at different vertical positions along the hub 204. According to embodiments, pairs of rotor blades (202a, 202b, 202c, 202d) can be mounted at the same vertical positions with respect to the base of the hub 204 such that different pairs of rotor blades (202a, 202b, 202c, 202d) are mounted at different vertical positions along the hub 204. For example, rotor blades 202a and 202c may be mounted at a first vertical position and rotor blades 202b and 202d may be mounted at a second vertical position, where the first and second vertical positions are different vertical positions along the hub 204. In various embodiments, the first rotor bade 202a and the third rotor blade 202c can be mounted to the hub 204 at a first vertical position (i.e., the same vertical position) on the hub 204. In various embodiments, the second rotor blade 202b and the fourth rotor blade 202d can be mounted to the hub 204 at a second vertical position (i.e., the same vertical position) on the hub 204. As the rotor blades (202a, 202c and 202b, 202d) on opposite sides of the hub 204 are mounted at different vertical heights with respect to the base of the hub 204, an angle (θ) 208 is formed between the first rotor blade 202a and the second rotor blade 202b, as well as the third rotor blade 202c and the fourth rotor blade 202d. In some embodiments, the angle 208 between the first rotor blade 202a and the second rotor blade 202b can be the same as the angle 208 between the third rotor blade 202c and the fourth rotor blade 202d. Alternatively, the angle 208 between the first rotor blade 202a and the second rotor blade 202b can be different from the angle 208 between the third rotor blade 202c and the fourth rotor blade 202d.

In various embodiments, the hub 204 can be mounted on a driveshaft 212 configured to provide one or more of power, torque, rotation, etc. For example, a driveshaft 212 can be designed to provide rotation to the hub 204 and corresponding roto blades (202a, 202b, 202c, 202d) attached to the hub 204. Additionally or alternatively, the hub 204 can be attached to a drive mechanism, such as a motor, in the spinner. For example, the hub 205 can be attached to an electronic motor configured to control the hub 204 and rotor blades (202a, 202b, 202c, 202d) thus the motor can be used to drive the rotor blades (202a, 202b, 202c, 202d) and hub 204 to rotate around an axis of rotation (e.g., Z-axis illustrated in FIG. 2B). In some instances, the driveshaft 212 may be coupled to the drive mechanism, such as a motor, and configured to transfer power from the drive mechanism to the hub 204. In some embodiments, the total vertical height of the hub can be determined by a minimum distance from the rotor blade (202a, 202b, 202c, 202d) to the spinner. In various embodiments, the hub 204 can be hollow. The motor integration can be inside a boom underneath the hub 204. For example, the motor parts may be low-profile so that the entire motor fits within the hub 204, providing lower resistance to the air flow and reducing drag.

The rotor blades (202a, 202b, 202c, 202d) can be mounted at a minimum height from the bottom of the hub 204 to avoid interference with the boom. The hub 204 can have a vertical height as required to achieve the desired blade separation. For example, to allow for a large degree of blade separation, the hub 204 can be configured to have a large vertical height compared to conventional hubs. The separation between the rotor blades (202a, 202b, 202c, 202d) may be determined according to the following formula:

$$h = R\left[0.25\left(\frac{c_T}{\sigma}\right)\frac{2\pi}{N_b} + 8e^{-0.25\left(7+\sqrt{\frac{8}{c_T}}\right)}\right]$$

wherein h is the minimum vertical separation between blade roots, $C_T$ is the thrust coefficient, $\sigma$ is the solidity ratio, $N_b$ is the number of blades, and R is the rotor radius.

The separation between the rotor blades (202a, 202b, 202c, 202d) can be described as a distance 210 between the multiple tip path planes (e.g., the first plane 206a and the second plane 206b) of the rotor blades. The speed at which the rotor blades (202a, 202b, 202c, 202d) spin (or the disk loading) may determine the magnitude of separation between the rotor blades (202a, 202b, 202c, 202d). For example, the rotor blades (202a, 202b, 202c, 202d) can be designed for a first speed (rpm) when in a hover configuration. If the rotor blades (202a, 202b, 202c, 202d) are spinning slower than the first speed, the separation between the rotor blades (202a, 202b, 202c, 202d) would need to be larger since the wake is moving slower. If the rotor blades (202a, 202b, 202c, 202d) are spinning faster than the first speed, the separation between the rotor blades (202a, 202b, 202c, 202d) can be reduced.

According to various embodiments, the rotor blades (202a, 202b, 202c, 202d) of an exemplary aircraft can be tuned to the rotor speed required for flight in a hover configuration. In various embodiments, the rotor blades (202a, 202b, 202c, 202d) of an exemplary aircraft can be tuned to the rotor speed required for flight in a forward flight configuration. Additionally or alternatively, the rotor blades (202a, 202b, 202c, 202d) of an exemplary aircraft can be tuned to or configured to adjust to the rotor speed required for flight in both a hover configuration and a forward flight configuration.

In various embodiments, the rotor blades (102a, 102b, 102c, 102d) can be identical except the root of the rotor blades (102a, 102b, 102c, 102d) attached to the hub 104. For example, each rotor blade (102a, 102b, 102c, 102d) can have a fixed angular position on the hub 104 that varies by degree.

Figure 3A:
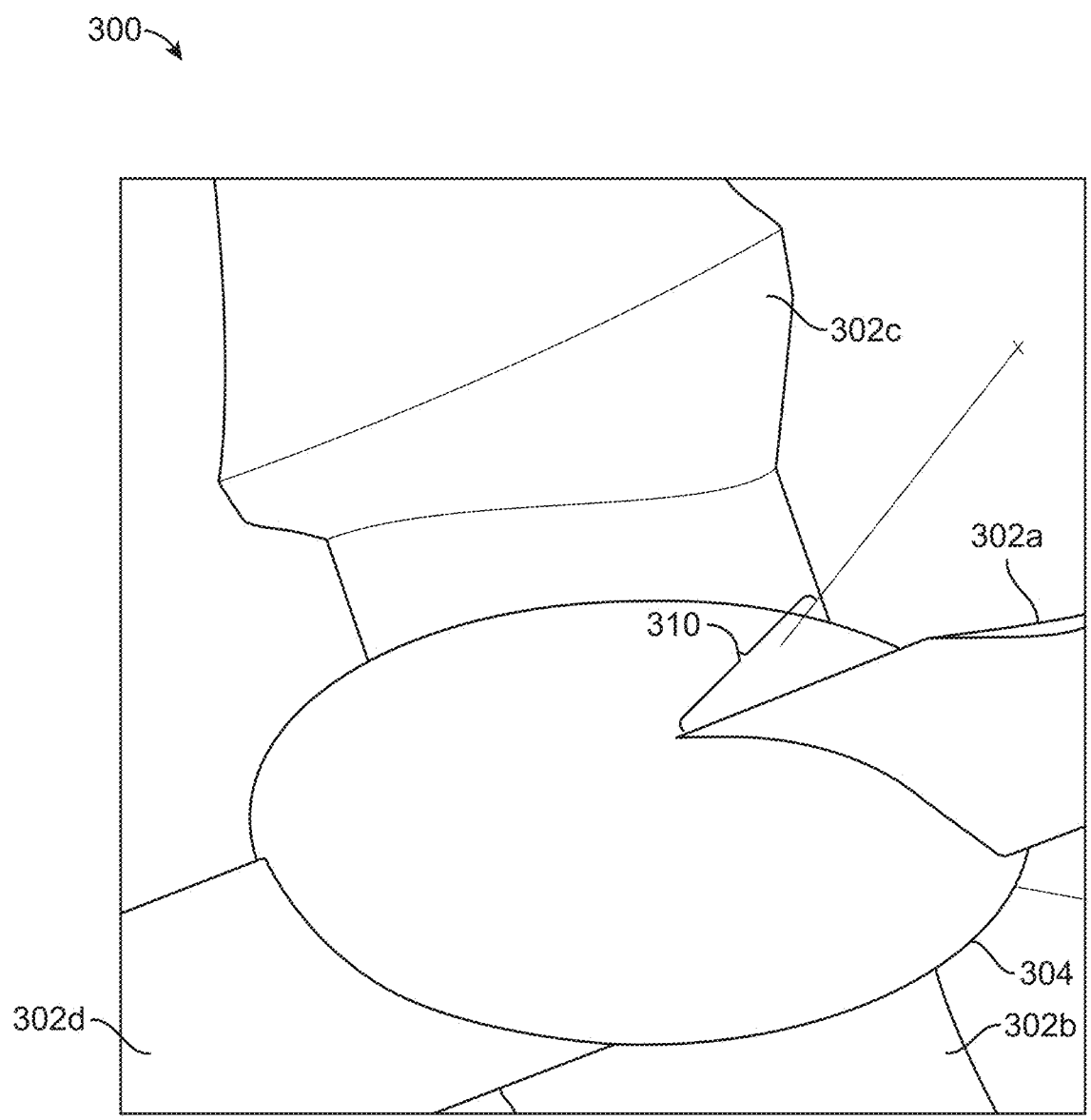
FIG. 3A illustrates a detailed side-view of an exemplary four-bladed rotor system, according to various embodiments.

FIG. 3A illustrates a detailed side-view of an exemplary four-bladed rotor system 300, according to various embodiments. FIG. 3A illustrates a first rotor blade 302a and a third rotor blade 302d attached to the hub 304 at a first vertical position (i.e., the same vertical position). A second rotor blade 302b and a fourth rotor blade 302c can be attached to the hub 304 at a second vertical position (i.e., the same vertical position). As illustrated, the first vertical position and the second vertical position can be at different vertical positions along the hub 304. A root section of the first rotor blade 302a and the third rotor blade 302d can be separated by a vertical distance 310 from the root section of the second rotor blade 302b and the fourth rotor blade 302c. In this way, as the rotor system 300 rotates, the root section (as well as the tip) of the first rotor blade 302a and the third rotor blade 302d pass through different path planes from that of the second rotor blade 302b and the fourth rotor blade 302c. As a result, the wake and turbulence from the first rotor blade 302a and the third rotor blade 302d can be minimized upon the second rotor blade 302b and the fourth rotor blade 302c, respectively.

In instances where the rotor blades (302a, 302b, 302c, 302d) pass through the same path plane, each rotor blade (302a, 302b, 302c, 302d) will pass through the wake shed of the preceding blade. The rotor blades (302a, 302b, 302c, 302d) interacting with the wakes shed by preceding blades result in noise originating from pressure spikes from wake impingement. Therefore, by varying the position of the rotor blades (302a, 302b, 302c, 302d) on the hub 304 such that at least a portion of the rotor blades (302a, 302b, 302c, 302d) pass through differing path planes, the wake and turbulence on subsequent (e.g., adjacent) rotor blades is reduced. In turn, the drag and noise produced by the rotor blades (302a, 302b, 302c, 302d) is reduced.

Figure 3B:
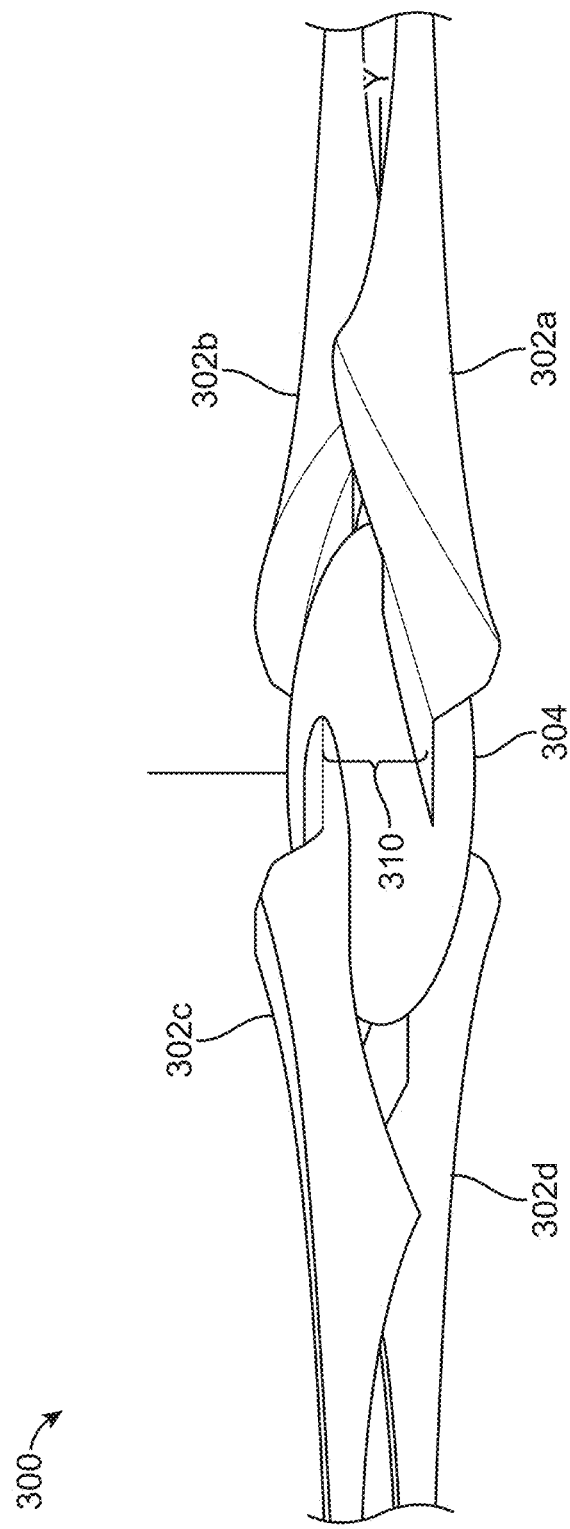
FIG. 3B illustrates a detailed side-view of the exemplary four-bladed rotor system, according to various embodiments.

FIG. 3B illustrates a detailed side-view of the exemplary four-bladed rotor system 300, according to various embodiments. FIG. 3B illustrates a first rotor blade 302a and a third rotor blade 302d attached to the hub 304 at a first vertical position. A second rotor blade 302b and a fourth rotor blade 302c can be attached to the hub 304 at a second vertical position. As depicted, the first vertical position and the second vertical position can be different vertical positions resulting in multiple tip path planes such that the rotor blades 302a and 302d travel in a different tip path plane than rotor blades 302b and 302c. A root section of the first rotor blade 302a and the third rotor blade 302d can be separated by a vertical distance 310 from the root section of the second rotor blade 302b and the fourth rotor blade 302c. In this way, as the improved rotor system 300 rotates, the wake and turbulence from first rotor blade 302a and the third rotor blade 302d can be minimized upon the second rotor blade 302b and the fourth rotor blade 302c, respectively.

Figure 4:
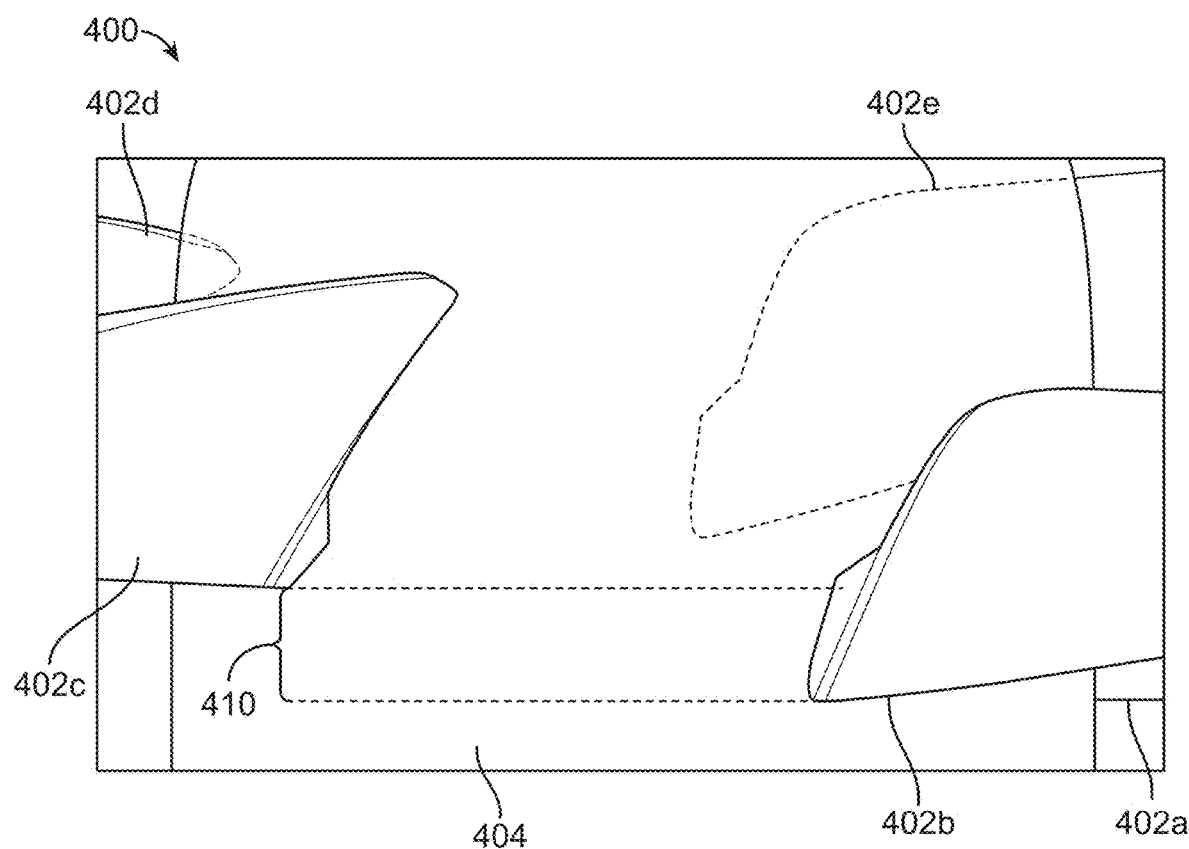
FIG. 4 illustrates a detailed side-view of an exemplary four-bladed rotor system, according to various embodiments.

FIG. 4 illustrates a detailed side-view of an exemplary four-bladed rotor system 400 having an odd number of rotor blades (402a, 402b, 402c, 402d, 402e), according to various embodiments. FIG. 4 illustrates an exemplary rotor system 400 having five rotor blades (402a, 402b, 402c, 402d, 402e). Even though five rotor blades (402a, 402b, 402c, 402d, 402e) are illustrated, the following techniques can be employed by rotor systems with other odd number of rotor blades (e.g., three, seven, etc.). In embodiments with an odd number of rotor blades (402a, 402b, 402c, 402d, 402e), the individual blades can be a predetermined distance 410 apart. In alternative embodiments with an odd number of rotor blades (402a, 402b, 402c, 402d, 402e), the individual blades can be a varied predetermined distance 410 apart. For example, rotor blades 402a and 402b may be a first distance apart and rotor blades 402b and 402c may be a second distance apart, where the first and second distance are different. Different configurations of rotor blade (402a, 402b, 402c, 402d, 402e) placement may be chosen such that the rotor blades (402a, 402b, 402c, 402d, 402e) do not pass through the same tip path plane as each other. In some embodiments for an odd number of blades, the rotor blades (402a, 402b, 402c, 402d, 402e) can be mounted to the hub 404 as a spiral staircase configuration. Alternatively, the rotor blades (402a, 402b, 402c, 402d, 402e) can be mounted to the hub 404 in a zig-zag configuration. In this way, the separation between rotor blades (402a, 402b, 402c, 402d, 402e) reduces the wake interference from subsequent rotor blades.

In various embodiments, the vertical distance 410 between rotor blades (402a, 402b, 402c, 402d, 402e) can be determined by using high fidelity computational fluid dynamic (CFD) simulations and flight test data. For example, the rotor blades (402a, 402b, 402c, 402d, 402e) may be staggered at different vertical heights with respect to the base of the hub 404 as compared to a preceding rotor blade (e.g., a following rotor blade, a rotor blade positioned before) and a succeeding rotor blade (e.g., a leading rotor blade, a rotor blade positioned after, a rotor blade which follows the preceding rotor blade). Based on the aircraft needs, different vertical distances 410 between rotor blades (402a, 402b, 402c, 402d, 402e) may be chosen to optimally reduce the wake interference between rotor blades (402a, 402b, 402c, 402d, 402e).

Figure 5:
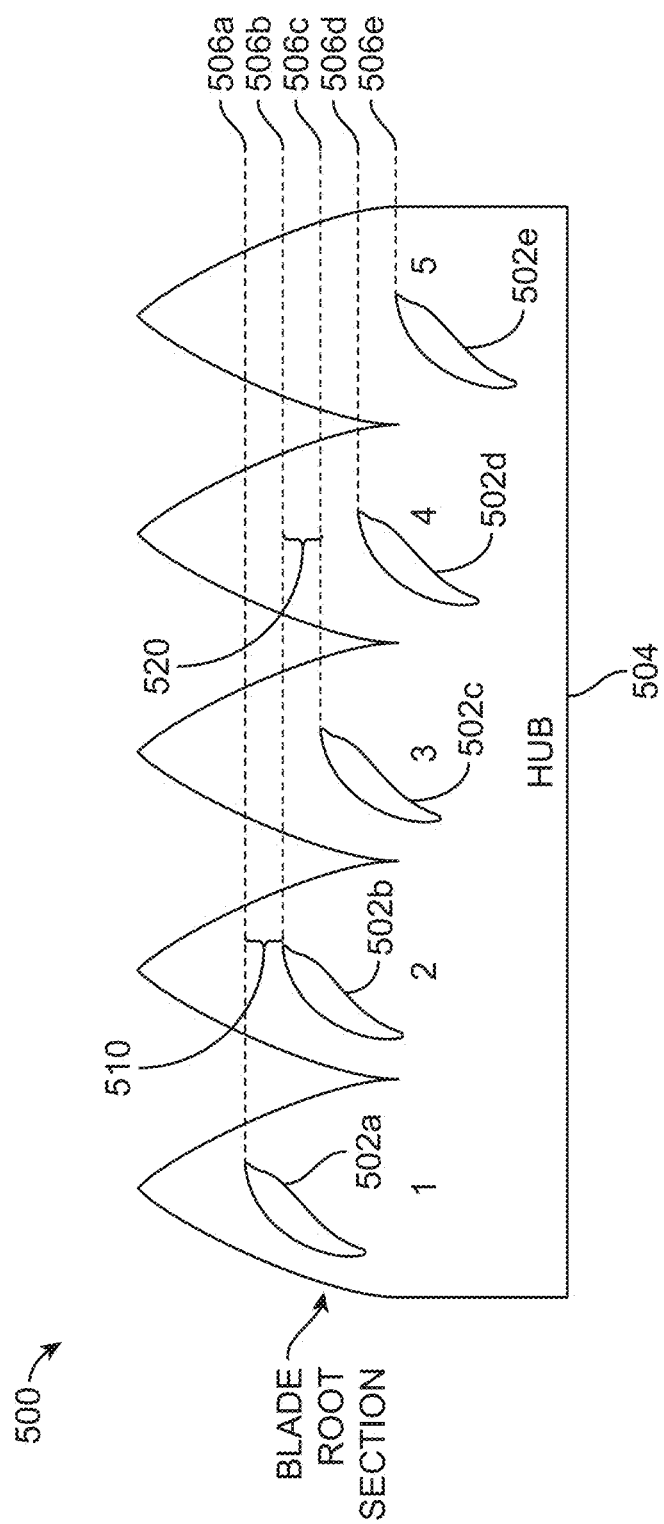
FIG. 5 illustrates exemplary tip path planes for a staggered rotor blade design, according to various embodiments.

FIG. 5 illustrates exemplary tip path planes for a staggered rotor blade design, according to various embodiments. FIG. 5 provides an illustration of a rotor system 500 having five rotor blades (502a, 502b, 502c, 502d, 502e). In some embodiments, the rotor system 500 may correspond to the rotor system 400 illustrated in FIG. 4 (e.g., rotor blades (502a, 502b, 502c, 502d, 502e) may correspond to rotor blades (402a, 402b, 402c, 402d, 402e)). Even though five rotor blades (502a, 502b, 502c, 502d, 502e) are illustrated, the techniques described herein can be employed by rotor systems 500 with any number of rotor blades (e.g., three, four, six, seven, etc.). In embodiments with an odd number of rotor blades (and in some embodiments with an even number of rotor blades), the individual blades can be positioned a predetermined distance (510, 520) apart along the hub 504. In various embodiments, the distance (510, 520) can be the same between each of the rotor blades (502a, 502b, 502c, 502d, 502e). In various embodiments, a first distance 510 between a first set of consecutive rotor blades may be different than a second distance 520 between a second set of consecutive rotor blades. For example, the first distance 510 between rotor blade 502a and 502b may be larger than the second distance 520 between 502b and 502c. In other embodiments, the distance 510 can vary between each of the rotor blades (502a, 502b, 502c, 502d, 502e).

The rotor blades (502a, 502b, 502c, 502d, 502e) can be mounted to the hub 504 in varying configurations. In an embodiment, the rotor blades (502a, 502b, 502c, 502d, 502e) can be mounted to the hub 504 in a spiral staircase configuration. Alternatively, the rotor blades (502a, 502b, 502c, 502d, 502e) can be mounted to the hub 504 in a zig-zag configuration. Each of the rotor blades (502a, 502b, 502c, 502d, 502e) travels in separate tip path planes (506a, 506b, 506c, 506d, 506e) separated by the distance (510, 520). By separating each rotor blade (502a, 502b, 502c, 502d, 502e) by a distance (510, 520), such that each rotor blade (502a, 502b, 502c, 502d, 502e) passes through a separate tip path plane, the wake interference from subsequent rotor blades is reduced. The reduced wake interference between rotor blades (502a, 502b, 502c, 502d, 502e) causes, as a result, a reduction in drag and improve the overall aerodynamic efficiency of the aircraft. By improving the overall aerodynamic efficiency of the aircraft, the required energy needed by the aircraft is reduced and the maximum travel range of the aircraft is increased.

Figure 6:
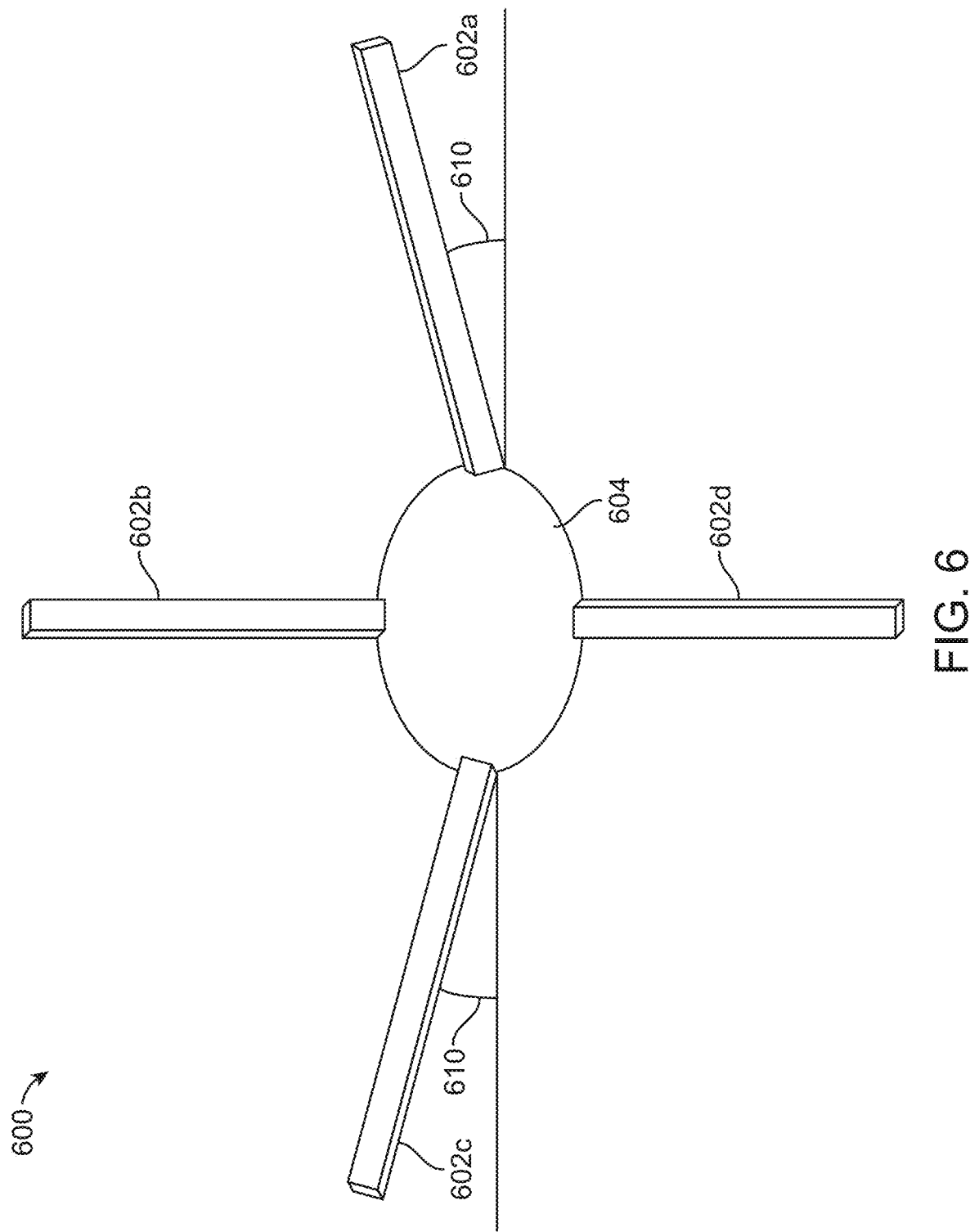
FIG. 6 illustrates an exemplary design with an opposing pair of rotor blades mounted at a dihedral angle, according to various embodiments.

FIG. 6 illustrates an exemplary design with an opposing pair of rotor blades (602a and 602c, and/or 602b and 602d) mounted at a dihedral angle 610, according to various embodiments. FIG. 6 illustrates a rotor system 600 having four rotor blades (602a, 602b, 602c, 602d). While four rotor blades (602a, 602b, 602c, 602d) are illustrated in FIG. 6, the technique can be used for rotor systems 600 with any even number (e.g., six, eight) number of rotor blades. In various embodiments, the rotor blades (602a, 602b, 602c, 602d) can be mounted at the same vertical position on the hub 604. To reduce the wake interaction between rotor blades (602a, 602b, 602c, 602d) mounted at the same vertical position on the hub 604, instead of staggering the mounting point of each blade on the hub 604, at least a subset of the rotor blades (602a, 602b, 602c, 602d) can be mounted at a dihedral angle 610 to the hub 604. For example, rotor blades 602a and 602c can be mounted at a 30 degree dihedral angle to the hub 604. The dihedral angle 610 separates the tip path planes for succeeding rotor blades (e.g., rotor blades which follow the preceding blades) thereby reducing wake interference from subsequent rotor blades. The dihedral angle 610 of at least the subset of the rotor blades (602a, 602b, 602c, 602d) may be determined according to the following formula:

$$\theta = \mathrm{acos}\left(\frac{2R^2 - h^2}{2R^2}\right)$$

wherein θ is minimum angular separation, and R is the rotor radius, and h is the minimum vertical separation.

In embodiments for an even number of rotor blades (602a, 602b, 602c, 602d), opposing blades (e.g., a first rotor blade 602a and third rotor blade 602c, or a second rotor blade 602b and fourth rotor blade 602d) can be mounted at the same dihedral angle 610. For example, the second rotor blade 602b and fourth rotor blade 602d may be mounted at the same dihedral angle 610 such that the rotor blades 602b and 602d travel in the same tip path plane. In some embodiments, each opposing blade (e.g., a first rotor blade 602a and third rotor blade 602c, and a second rotor blade 602b and fourth rotor blade 602d) are at the same dihedral angle 610 to each other, but at a different dihedral angle 610 to adjacent blades (e.g., a first rotor blade 602a and second rotor blade 602b, and a third rotor blade 602c and fourth rotor blade 602d). For example, rotor blades 602a and 602c can be at a first dihedral angle 610 and rotor blades 602b and 602d can be at a second dihedral angle 610. In this example, the first dihedral angle 610 and the second dihedral angle 610 are not equivalent.

In various embodiments, instead of mounting at a dihedral angle 610, the opposed rotor blades can be mounted at an anhedral angle. For example, rotor blades 602a and 602c may be mounted on the hub 602 at a 30 degree anhedral angle. In some embodiments, for an even number of rotor blades (602a, 602b, 602c, 602d), opposing blades (e.g., a first rotor blade 602a and third rotor blade 602c, or a second rotor blade 602b and fourth rotor blade 602d) can be mounted at the same anhedral angle. For example, the second rotor blade 602b and fourth rotor blade 602d may be mounted at the same anhedral angle such that the rotor blades 602b and 602d travel in the same tip path plane. In some embodiments, each opposing blade (e.g., a first rotor blade 602a and third rotor blade 602c, and a second rotor blade 602b and fourth rotor blade 602d) are at the same anhedral angle to each other, but at a different anhedral angle to adjacent blades (e.g., a first rotor blade 602a and second rotor blade 602b, and a third rotor blade 602c and fourth rotor blade 602d). For example, rotor blades 602a and 602c can be at a first anhedral angle and rotor blades 602b and 602d can be at a second anhedral angle. In this example, the first anhedral angle and the second anhedral angle are not equivalent. Therefore, even if all rotor blades (602a, 602b, 602c, 602d) are provided at a same vertical distance from the base of the hub 604, coupling at least one pair of the rotor blades to the hub at a dihedral angle 610 or anhedral angle would result in the tips of rotor blades traveling in different path planes.

According to various embodiments, at least a pair of the rotor blades (602a, 602b, 602c, 602d) may be coupled to the hub at a dihedral angle, and at least two of the rotor blades (602a, 602b, 602c, 602d) may be provided at a different vertical distance from the base of the hub 604.

In some embodiments, a rotor system 600 can include opposing blades (e.g., a first rotor blade 602a and third rotor blade 602c, and a second rotor blade 602b and fourth rotor blade 602d) mounted at both anhedral angles and dihedral angles 610. For example, rotor blades 602a and 602c can be mounted at a dihedral angle 610 and rotor blades 602b and 602d can be mounted at an anhedral angle. By mounting rotor blades (602a, 602b, 602c, 602d) at varying anhedral angles and/or dihedral angles 610 in this manner, the opposing blades will travel in the same tip path plane. When the rotor blades (602a, 602b, 602c, 602d) are mounted in alternating blade anhedral/dihedral configurations, the blade-wake interaction of the rotor system 600 can be reduced, which can improve the aerodynamic efficiency of the rotor system 600 and the overall aircraft.

Moreover, having at least one pair of opposing rotor blades (602a, 602b, 602c, 602d) mounted to the hub at a dihedral angle can allow for more blade span in the same disk area. For example, by setting rotor blades (602a and 602c) at a dihedral angle 610, the disk area can accommodate larger blade spans. Developing a rotor system 600 with more blade span results in a longer aspect ratio and, hence, a more efficient rotor system 600 with a lower torque than a conventional lift rotor system configuration. As a result, the figure of merit, described in further detail below with respect to FIGS. 7A and 7B, in hover for the improved rotor system 600 improves by up to 6% with little to no impact on total noise in comparison to conventional lift rotor system configurations.

In some embodiments, for a four rotor blade rotor system, two opposing rotor blades (e.g., the first rotor blade 602a and the third rotor blade 602c) can be mounted at a dihedral angle 610 and/or anhedral angle and the other two opposing rotor blades (e.g., the second rotor blade 602b and fourth rotor blade 602d) may not be mounted at an angle to the hub 604 (e.g., they are mounted flat with respect to the hub 604). Moreover, for an even rotor blade rotor system with more than four rotor blades, alternating opposing rotor blades can be mounted at a dihedral angle and/or anhedral angle and the other opposing rotor blades can be mounted with no angle or with a negligible angle to the hub 604. For example, every other rotor blade opposing pair can be mounted at a dihedral angle 610 to the hub 604, while the other opposing pairs can be mounted with no angle to the hub 604.

For odd number of rotor blade systems, each rotor blade can be mounted at a different dihedral angle 610 and/or anhedral angle so each of the rotor blade tips travel in a different tip path plane. For example, for a rotor system with three rotor blades, the first rotor blade can be mounted at a first dihedral angle 610, the second rotor blade can be mounted at a second dihedral angle 610, and the third rotor blade can be mounted at a third dihedral angle 610. In this example, the first, second, and third dihedral angles 610 are not the same.

Figure 7A:
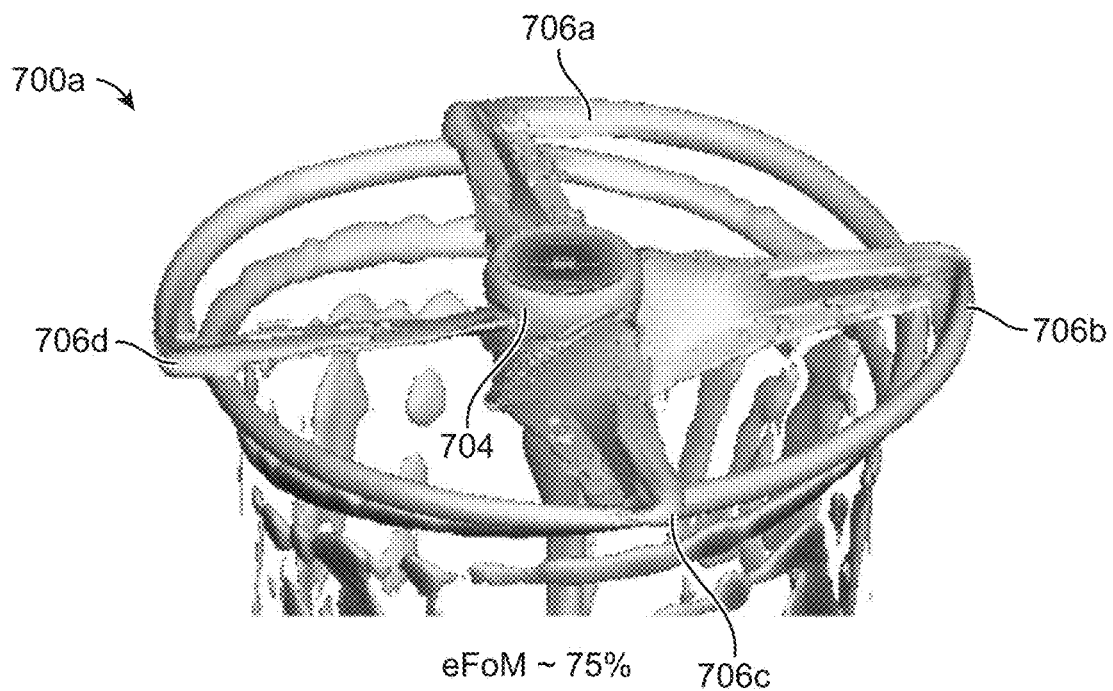
FIG. 7A illustrates a first exemplary wake vortex model for an exemplary rotor blade system, according to various embodiments.

FIG. 7A illustrates a first exemplary wake vortex model for an exemplary rotor blade system 700a, according to various embodiments. The rotor blades in FIG. 7A are mounted to the hub 704 with the same dihedral angle or the same anhedral angle. As shown, the rotor tip vortices (706a, 706b, 706c, 706d) caused by the rotating rotor blades can impinge on the subsequent rotor blades. As a result of the blade-wake interaction, the figure of merit for the first rotor blade system can be impacted. The figure of merit is a metric to evaluate hover efficiency of a rotor conveying the ratio of ideal power to the actual power consumed in hover by the rotor. A high figure of merit percentage correlates to a rotor system with better efficiency than a rotor system with a low figure of merit percentage. Thus, a figure of merit of 1 would represent a rotor system with "perfect" efficiency. For the first rotor blade system 700a, since the rotor blades are mounted on the hub 704 at the same dihedral angle or the same anhedral angle, the wake from preceding rotor blades impacts the succeeding rotor blades. In one embodiment, the estimated figure of merit for the first rotor blade system 700a is about 75%.

Figure 7B:
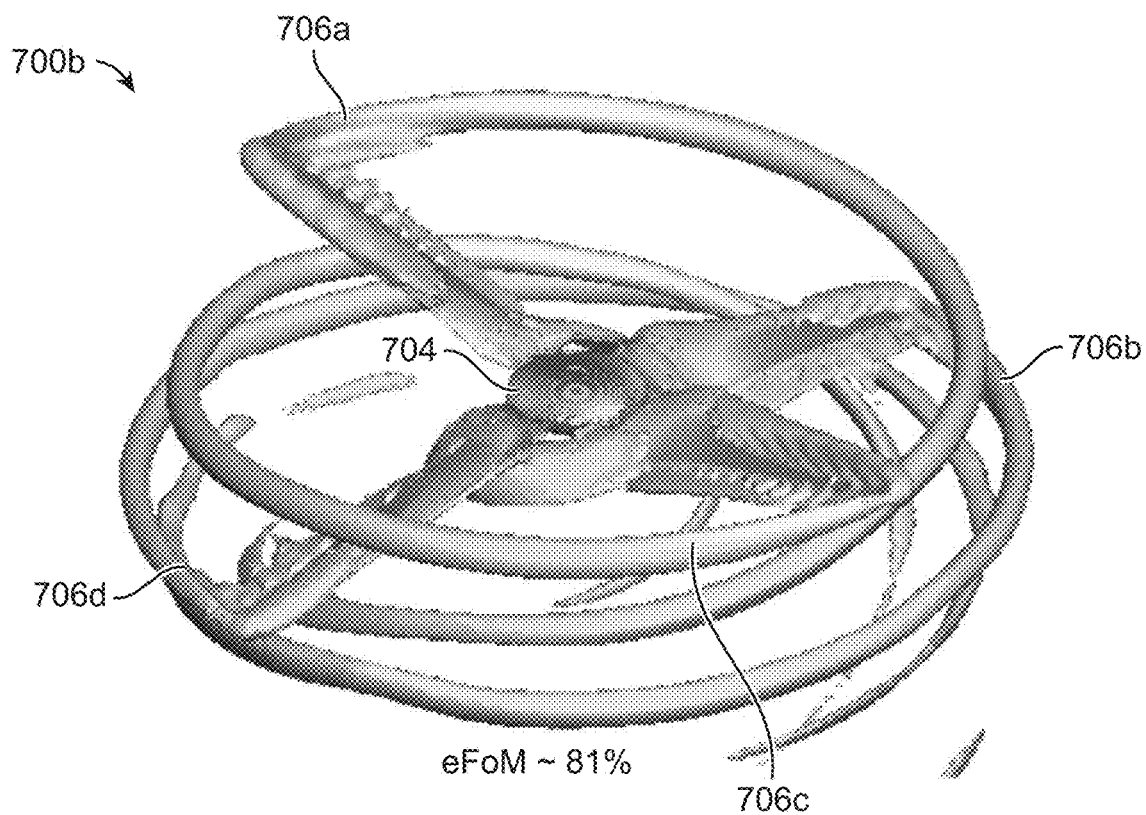
FIG. 7B illustrates a second exemplary wake vortex model for an exemplary rotor blade system, according to various embodiments.

FIG. 7B illustrates a second exemplary wake vortex model for an exemplary rotor blade system 700b, according to various embodiments. The opposing rotor blades in FIG. 7B are mounted to the hub 704 with a different dihedral angle or a different anhedral angle. As shown, as the hub rotates, the rotor blades do not pass through the same tip path planes as the preceding rotor blade as often. As a result, the rotor tip vortices (706a, 706b, 706c, 706d) do not impinge on subsequent rotor blades, meaning the wake-blade interaction is reduced. Thus, as compared to the first rotor blade system 700a illustrated in FIG. 7A, the second rotor blade system 700b has a higher figure of merit. Therefore, the staggered dihedral/anhedral angles of the second rotor blade system 800b produces a more efficient rotor blade system overall. In one embodiment, the estimated figure of merit for the second rotor blade system 700b is about 81%. This is a 6% improvement to efficiency in comparison to the first rotor blade system 800a with a figure of merit of about 75%.

Figure 8:
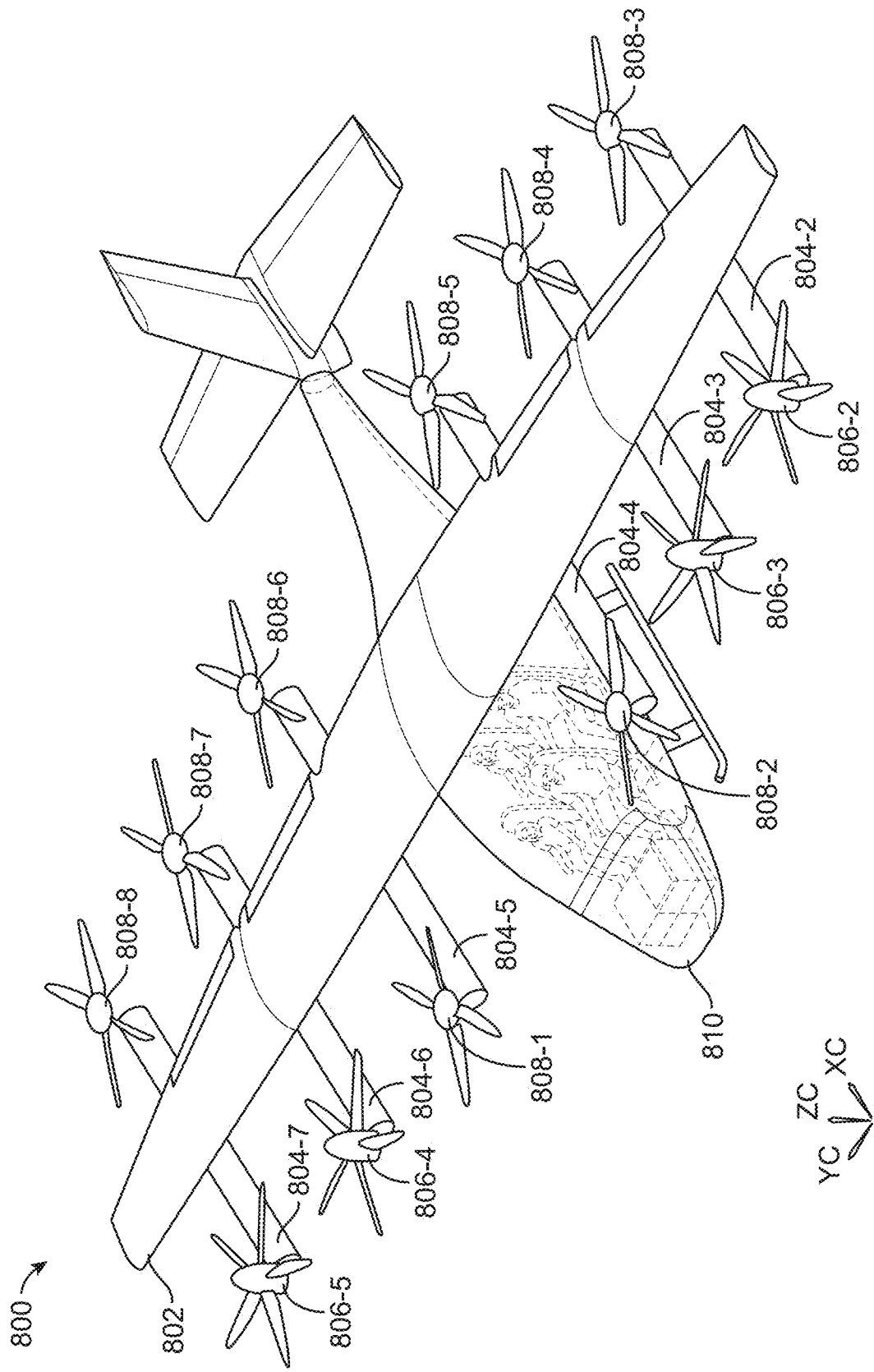
FIG. 8 illustrates an exemplary VTOL aircraft with a back row of fixed rotor system for vertical flight and a front row of two fixed rotor systems for vertical flight and four tilting rotor system, in a vertical flight configuration, according to various embodiments.

FIG. 8 illustrates an exemplary VTOL aircraft 800 with a back row of fixed rotor system (808-3, 808-4, 808-5, 808-6, 808-7, 808-8) for vertical flight (e.g., vertical lift rotor systems) and a front row of two fixed rotor systems (808-1, 808-2) for vertical flight and four tilting rotor system (806-2, 806-3, 806-4, 806-5) in a vertical flight position, according to various embodiments. The aircraft 800 can be any suitable type of flying vehicle, such as a helicopter, drone, airplane, etc. The aircraft can be configured for human piloting, remote piloting, and/or autonomous flight.

In various embodiments, one or more of the fixed rotor systems (808-1, 808-2, 808-3, 808-4, 808-5, 808-6, 808-7, 808-8) or tilting rotor systems (806-2, 806-3, 806-4, 806-5) can employ the staggered configuration rotor design as described above. VTOL aircraft 800 can include a fuselage 810, which may include a cabin section (e.g., toward the nose of the aircraft 800) for carrying passengers and/or cargo. The aircraft can further include wings 802 mounted or otherwise attached to fuselage 810. The wings 802 can take any shape, size, and configuration suitable for the aircraft 800. For example, the wings 802 can be a tapered straight wing configuration. While FIG. 8 illustrates the wings 802 coupled to the fuselage 810 in a high-wing configuration, the wings 802 may be coupled to the fuselage 810 at any suitable location, in any suitable orientation.

The aircraft 800 can include one or more support structures, such as booms (804-2, 804-3, 804-4, 804-5, 804-6, 804-7) coupled with wings 802. FIG. 8 depicts six booms (804-2, 804-3, 804-4, 804-5, 804-6, 804-7), with three booms (804-2, 804-3, 804-4 and 804-5, 804-6, 804-7) coupled to each wing 802. However, any suitable number and combination of support structures can be used. In some embodiments, the booms (804-2, 804-3, 804-4, 804-5, 804-6, 804-7) can be coupled to an underside of the wings 802 and can include a forward portion that extends forward to/beyond the front edge of the wing 802. The booms (804-2, 804-3, 804-4, 804-5, 804-6, 804-7) can also include aft portion that extends to/beyond the aft edge of the wing 802. In some embodiments, two or more of the support structures can be identical, configured to be interchangeable between positions on the wings 802. Alternatively or additionally, two or more of the support structures can be different configured for particular positions on the wings 802.

The VTOL aircraft 800 may further include one or more tilting rotor systems (806-2, 806-3, 806-4, 806-5) and one or more fixed rotor systems (808-1, 808-2, 808-3, 808-4, 808-5, 808-6, 808-7, 808-8) mounted on either end of the one or more booms (804-2, 804-3, 804-4, 804-5, 804-6, 804-7). For example, as illustrated, the fixed rotor system (808-1, 808-2, 808-3, 808-4, 808-5, 808-6, 808-7, 808-8) may be oriented such that the rotational axis of each rotor system is parallel with a direction of vertical flight and orthogonal to a direction of forward flight. For example, an aircraft 800 may have six fixed rotor systems oriented parallel with a direction of vertical flight so that the six fixed rotor systems may be used to generate vertical thrust (e.g., lift) for taking off, landing, hovering, stabilizing, and/or controlling the aircraft 800.

The tilting rotor system (806-2, 806-3, 806-4, 806-5) may be switched (e.g., rotated or tilted) between a forward flight configuration and a vertical flight configuration. For example, as illustrated, tilting rotor system (806-2, 806-3, 806-4, 806-5) are in a vertical configuration for vertical flight similar to the fixed rotor system (808-1, 808-2, 808-3, 808-4, 808-5, 808-6, 808-7, 808-8). The tilting rotor system (806-2, 806-3, 806-4, 806-5) may then be tilted from the vertical flight configuration to a forward flight configuration. For example, the tilting rotor system (806-2, 806-3, 806-4, 806-5) may be transitioned from a vertical flight configuration to a forward flight configuration to provide forward thrust for the aircraft 800. The tilting rotor system (806-2, 806-3, 806-4, 806-5) may be coupled to the one or more booms (804-2, 804-3, 804-4, 804-5, 804-6, 804-7) via one or more tilting mechanisms including, for example, motors and coupling mechanisms. The number of booms (804-2, 804-3, 804-4, 804-5, 804-6, 804-7) and/or tilting rotor systems (806-2, 806-3, 806-4, 806-5) and/or fixed rotor systems (808-1, 808-2, 808-3, 808-4, 808-5, 808-6, 808-7, 808-8) may vary in accordance with the flight needs and requirements of the aircraft 800.

In various embodiments, each rotor system of tilting rotor system (806-2, 806-3, 806-4, 806-5) and fixed rotor system (808-1, 808-2, 808-3, 808-4, 808-5, 808-6, 808-7, 808-8) can include a plurality of rotor system blades. The number and placement of the rotor system blades on each rotor system may be selected to provide enough thrust to propel VTOL aircraft 800 in the intended direction. For example, as illustrated, tilting rotor system (806-2, 806-3, 806-4, 806-5) includes 5 rotor system blades while fixed rotor system (808-1, 808-2, 808-3, 808-4, 808-5, 808-6, 808-7, 808-8) includes 4 rotor system blades.

One of ordinary skill in the art will appreciate that the number and location of the tilting rotor system is not limited to that illustrated in the figures and that the VTOL aircraft 800 can include fewer or more tilting rotor systems (806-2, 806-3, 806-4, 806-5) and fixed rotor systems (808-1, 808-2, 808-3, 808-4, 808-5, 808-6, 808-7, 808-8), provided at other positions on the individual booms or on other suitable locations on the aircraft 800. For example, the VTOL aircraft 800 can include a front and back row where each row has four tilting rotor systems (806-2, 806-3, 806-4, 806-5) and two fixed rotor systems (808-1, 808-2).

Figure 9:
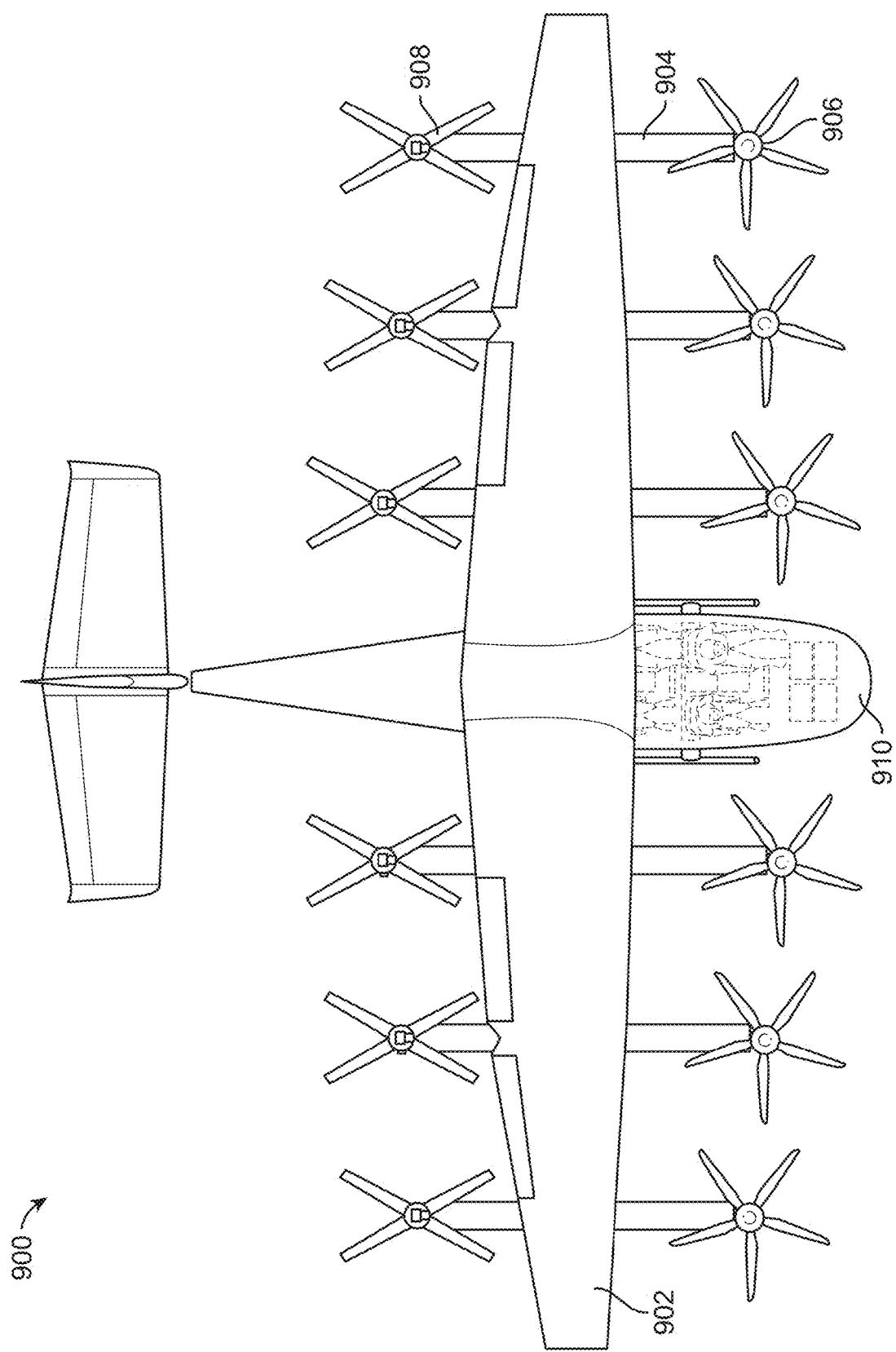
FIG. 9 illustrates an exemplary VTOL aircraft with a back row of fixed rotor systems for vertical flight and a front row of tilting rotor systems, in a vertical flight configuration, according to various embodiments.

FIG. 9 illustrates an exemplary VTOL aircraft 900 with a back row of fixed rotor systems 908 for vertical flight and a front row if tilting rotor systems 906, in a vertical flight configuration, according to various embodiments. According to various embodiments, VTOL aircraft 900 may be an electrically powered aircraft or a hybrid-electric aircraft. One or more battery units may be included in the aircraft 900 and may be configured to provide power to various components of the aircraft 900. For example, a plurality of battery units may be used to power one or more electric motors and an on-board computer system. In some embodiments, the VTOL aircraft 900 may be configured to carry one or more passengers and/or cargo and may be controlled automatically and/or remotely (e.g., may not require an on-board pilot to operate the aircraft). In the example shown, the VTOL aircraft 900 includes a fuselage 910 which may include a cabin section for carrying passengers and/or cargo. The VTOL aircraft 900 further includes wings 902 mounted to fuselage 910 in a high-wing configuration, however, the wings 902 may be mounted to the fuselage 910 at any suitable location for flight.

As previously describes, one or more booms 904 may be coupled to each wing 902. For example, FIG. 9 illustrates six booms 904, three booms 904 attached to each wing 902. Tilting rotor systems 906 and fixed rotor systems 908 may be mounted on either end of the one or more booms 904. In some embodiments, each boom 904 can have both one or more tilting rotor systems 906 and one or more fixed rotor systems 908 mounted to the boom 904. For example, as depicted in FIG. 9, each boom 904 can have a tilting rotor system 906 mounted to the front of the boom 904 and a fixed rotor system 908 mounted to the back of the boom 904. Alternatively, each boom 904 may have either one or more tilting rotor systems 906 or one or more fixed rotor systems 908 mounted to a boom 904. For example, a first boom 904 may have two tilting rotor systems 906 mounted to first boom 904, while a second boom 904 may have two fixed rotor systems 908 mounted to the second boom 904.

In various embodiments, the tilting rotor systems 906 may be configured to switch (e.g., rotated or tilted) between a forward flight configuration and a vertical flight configuration. For example, a command may be received by the aircraft 900 to transition the tilting rotor system 100 from a vertical flight configuration to a forward flight configuration to shift the aircraft 900 from a hover mode to a forward flight mode. In some embodiments, the fixed rotor systems 908 can be a vertical lift rotor system and can be oriented such that the rotational axis of each rotor system is parallel with a direction of vertical flight (e.g., for moving the aircraft in the vertical direction during, for example, take-off, hovering and/or landing). Alternatively, the fixed rotor systems 908 can be a forward flight rotor system and can be oriented such that the rotational axis of each rotor system is parallel with a direction of forward flight (e.g., for moving the aircraft in the forward direction during, for example, forward flight). In another embodiment, a combination of vertical lift rotor systems and forward flight rotor systems can be used (e.g., one or more fixed rotor systems 908 may be oriented such that the rotational axis of the rotor systems is parallel with the direction of vertical flight, while one or more additional fixed rotor systems 908 may be oriented such that the rotational axis of the rotor system is parallel with the direction of forward flight.) For example, the aircraft 900 may have a set of fixed rotor systems 908 oriented for use during forward flight and a set of fixed rotor systems 908 oriented for use during vertical flight.

In some embodiments, the fixed rotor systems 908 remain stationary (e.g., without rotating around the rotational axis) when the direction of flight is orthogonal to the rotational axis of the rotor systems. For example, during forward flight, the fixed rotor systems 908 may not rotate. In some embodiments, a locking mechanism can be coupled with the fixed rotor systems 908 to retain the rotor system blades in a predefined position and/or orientation when not in use. For example, the locking mechanism may be configured to lock the fixed rotor systems 908 in a predefined orientation when the VTOL aircraft 900 is flying in a forward direction. The predefined orientation may be configured to reduce the amount of aerodynamic drag (e.g., wind resistance) produced by air flowing across the fixed rotor systems 908. For example, the fixed rotor systems may be oriented such that the oncoming air during forward flight bisects the inter-blade angle between two adjacent blades, as further described above.

The type of rotor system mounted on each end of the booms 904 may be selected to enhance any number of flight characteristics including forward thrust, vertical thrust, maneuverability, drag, and/or any similar flight characteristic. For example, as illustrated in FIG. 9, the tilting rotor systems 906 are mounted on the forward ends of the booms 904 while the fixed rotor systems 908 are mounted on the aft ends of booms 904. Selecting the same type of rotor system for each respective end of each boom may reduce manufacturing costs and complexity by reducing the number of unique booms and associated parts required for the VTOL aircraft 900.

As discussed in more detail above, one or more of the tilting rotor systems 906 and/or the fixed rotor systems 908 can include two or more rotor blades mounted in a staggered configuration and/or at varied vertical heights with respect to the base of a hub of the rotor system (906, 908). For example, a rotor system (906, 908) can have rotor blades mounted at different vertical heights with respect to the base of the hub, such that they are in a staggered configuration, such as in a stepped pattern. In non-staggered rotor systems, as the rotor blades spin, the rotor blades interact with the wakes shed by preceding blades. For example, at the tip of a rotor blade, the interaction of the vortex shed between blades results in tip vortex noise. Similarly, along the inboard sections of a rotor blade, the wake shed between rotor blades results in a leading edge noise on the following blade, originating from a pressure spike from the wake impingement. By staggering the mounting location of the rotor blades along the hub the blade-wake interaction can be reduced. Specifically, when the rotor blades are mounted along the hub in a staggered configuration, the rotor blades are moved out of the wake of the preceding blades. In turn, there is a reduction in the pressure spikes from the wake impingement which, as a result, reduces the noise in the far field and the drag on the rotor system. For example, the noise in the far field can be reduced as much as 5 dBA per rotor system (about two thirds of the original perceived noise), while preserving the aerodynamic efficiency of the rotor systems.

Figure 10:
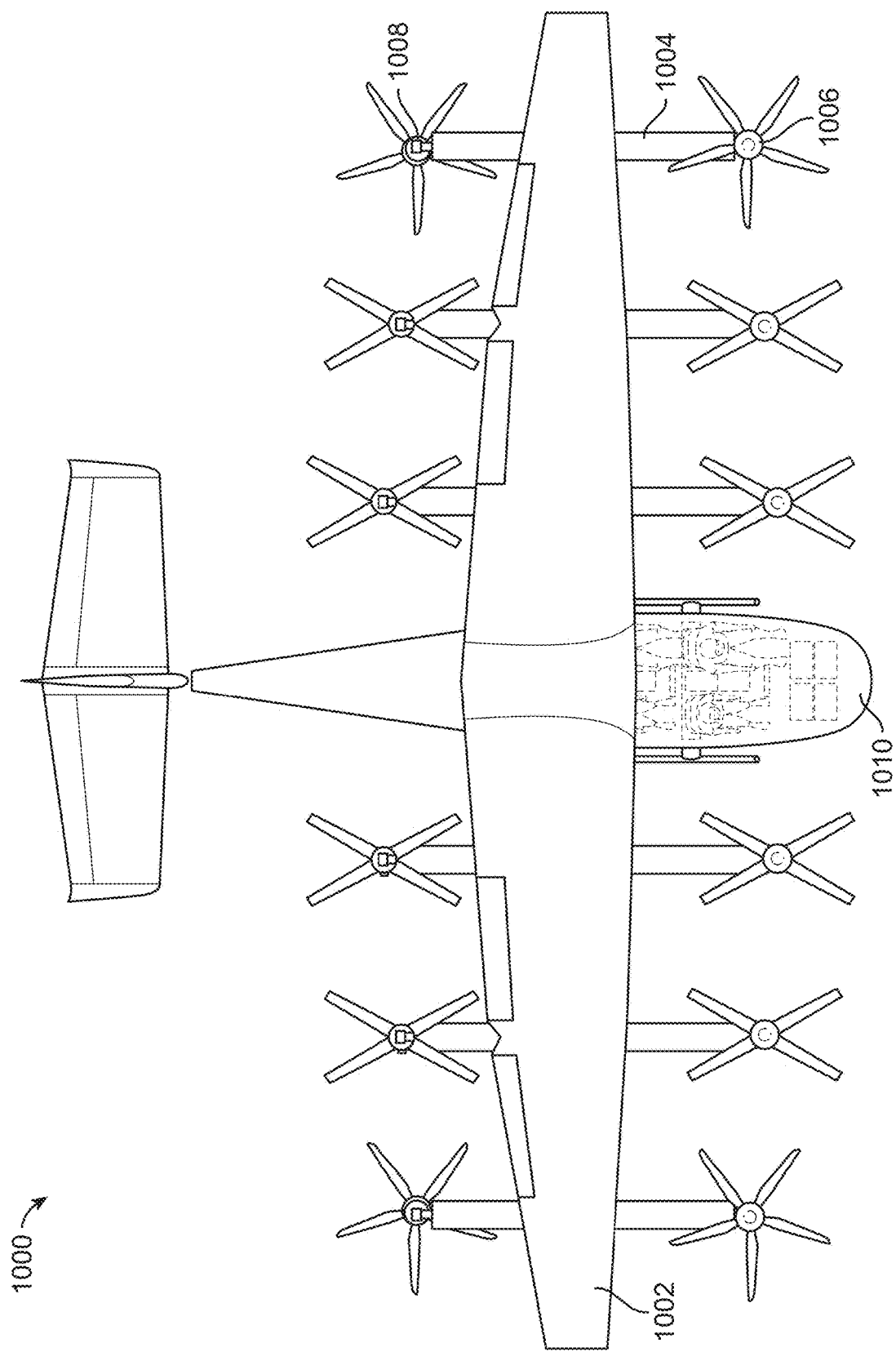
FIG. 10 illustrate an exemplary VTOL aircraft with tilting rotor systems on the distal ends of the wings, in a vertical flight configuration, and fixed rotor systems in between the tilting rotor systems, according to various embodiments.

FIG. 10 illustrates an exemplary VTOL aircraft 1000 with tilting rotor systems 1006 on the distal ends of the wings 1002, in a vertical flight configuration, and fixed rotor systems 1008 in between the tilting rotor systems 1006, according to various embodiments. The components depicted in FIG. 10 which are similar to those in FIG. 9 function similarly and the description of such provided above will be omitted for brevity purposes.

The type of rotor system mounted on each end of the booms 1004 may be selected to enhance any number of flight characteristics including forward thrust, vertical thrust, maneuverability, drag, and/or any similar flight characteristic. For example, as illustrated in FIG. 10, the tilting rotor systems 1006 can be mounted on both ends of the distal booms 1004 while the fixed rotor systems 1008 can be mounted on both ends of the remaining booms proximal to fuselage 1010. Selecting the tilting rotor systems 1006 for the ends of the distal booms may provide better yaw authority to the VTOL aircraft 1000 as compared to other configurations.

According to various embodiments, the flight control system (or another control system coupled to the VTOL aircraft 1000) may control the tilting mechanisms to switch the positioning of the tilting rotor systems 1006 from the forward flight position to the vertical position, as well as from the vertical position to the forward flight position. According to various embodiments, the control system (e.g., flight control system) may control the tilting rotor systems 1006 between the two positions based on sensor data and/or flight data received from the sensors (e.g., sensor measuring air temperature, electric motor temperature, airspeed of the aircraft, etc.), computers, and other input/output devices coupled to the aircraft. Additionally or alternatively, the control system (e.g., flight control system) may control the tilting rotor systems 1006 between the two positions based on commands received via control panel (e.g., GUI) onboard the aircraft 1000, or from a location outside of the aircraft 1000 (e.g., a location on the ground).

As discussed in more detail above, one or more of the tilting rotor systems 1006 and/or the fixed rotor systems 1008 can include rotor blades provided at dihedral and/or anhedral angles. For example, for a rotor system (1006, 1008) with an even number of rotor blades, opposing rotor blades may be mounted at a dihedral angle different to the mounting angle of adjacent rotor blades. Similar to mounting the rotor blades in a staggered configuration, mounting blades at particular dihedral and/or anhedral angles can place the blades in differing tip path planes. Thus, as the hub rotates, one or more of the rotor blades will travel in separate tip path planes and the wake vortices impingement on subsequent rotor blades can be reduced. In turn, the drag experienced by a rotor system (1006, 1008) can be reduced and the overall aerodynamic efficiency of the aircraft 1000 can be improved. Additionally, by reducing the tip to tip interaction noise between closely spaced rotors the aircraft 1000 can produce a lower acoustic signature.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front" or "back" and the like can be used to describe an element and/or feature's relationship to other element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

While embodiments herein have been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

The above description is illustrative and is not restrictive. Many variations of the embodiments will become apparent to those skilled in the art upon review of the disclosure. The scope of patent protection should, therefore, be determined not with reference to the above description, but instead should be determined with reference to the following claims along with their full scope or equivalents.

What is claimed is:

1. A rotor system comprising:
a hub that extends a vertical height from a base of the hub when mounted on a driveshaft; and
a plurality of rotor blades mounted to the hub, wherein the rotor blades are staggered at different vertical positions with respect to the base of the hub as compared to a preceding rotor blade and a succeeding rotor blade, wherein at least a first blade root and a second blade root are mounted along the hub a vertical distance apart, a magnitude of the vertical distance based on at least one of a first speed when in a hover configuration or a second speed when in a forward flight configuration, wherein a vertical separation between at least two blade roots at the hub is a function of one or more of a thrust coefficient, a number of blades, and a rotor radius.

2. The rotor system of claim 1, wherein the rotor system comprises an even number of rotor blades, and wherein pairs of rotor blades on opposite sides of the hub are mounted at a same vertical position with respect to the base of the hub.

3. The rotor system of claim 1, wherein the rotor system comprises an odd number of rotor blades, wherein each of the rotor blades is mounted at a different vertical position.

4. The rotor system of claim 1, wherein subsequent rotor blades are a predetermined vertical distance apart.

5. The rotor system of claim 4, wherein the predetermined vertical distance generates multiple tip path planes a fixed vertical distance apart.

6. An aircraft comprising:
a pair of wings mounted to a fuselage;
one or more booms coupled to the pair of wings;
a plurality of rotor systems mounted to the one or more booms, a rotor system among the plurality of rotor systems comprising:
a hub that extends a vertical height from a base of the hub when mounted on a driveshaft; and
a plurality of rotor blades mounted to the hub, wherein the rotor blades are staggered at different vertical positions with respect to the base of the hub as compared to a preceding rotor blade and a succeeding rotor blade, wherein at least a first blade root and a second blade root are mounted along the hub a vertical distance apart, a magnitude of the vertical distance based on at least one of a first speed when in a hover configuration or a second speed when in a forward flight configuration, wherein a vertical separation between blade roots at the hub is a function of one or more of a thrust coefficient, a number of blades, or a rotor radius.

7. The aircraft of claim 6, wherein the rotor system comprises an even number of rotor blades, and wherein pairs of rotor blades on opposite sides of the hub are mounted at a same vertical position with respect to the base of the hub.

8. The aircraft of claim 6, wherein the rotor system comprises an odd number of rotor blades, wherein each of the rotor blades is mounted at a different vertical position.

9. The aircraft of claim 6, wherein adjacent rotor blades are a predetermined vertical distance apart.

10. The aircraft of claim 9, wherein the predetermined vertical distance generates multiple tip path planes a fixed vertical distance apart.

11. The aircraft of claim 6, wherein one or more of the plurality of rotor blades have different chord lengths.

12. The aircraft of claim 7, wherein the pairs of rotor blades on opposite sides of the hub are mounted with a same dihedral angle.

13. The aircraft of claim 7, wherein the pairs of rotor blades on opposite sides of the hub are mounted with a same anhedral angle.

14. The aircraft of claim 9, wherein the rotor blades are in a staggered configuration comprising a first rotor blade at a first vertical distance from a second rotor blade and the second rotor blade at a second vertical distance from a third rotor blade.

15. The aircraft of claim 14, wherein the first vertical distance is same as the second vertical distance.

16. The aircraft of claim 7, wherein the plurality of rotor systems comprise one or more vertical lift rotor systems.

* * * * *